Oct. 24, 1933.　　　H. A. DENMIRE　　　1,931,924
BEAD FLIPPER MACHINE
Filed Feb. 6, 1931　　8 Sheets-Sheet 1

INVENTOR
*Harold A. Denmire*
BY
*Evans + McCoy*
ATTORNEYS

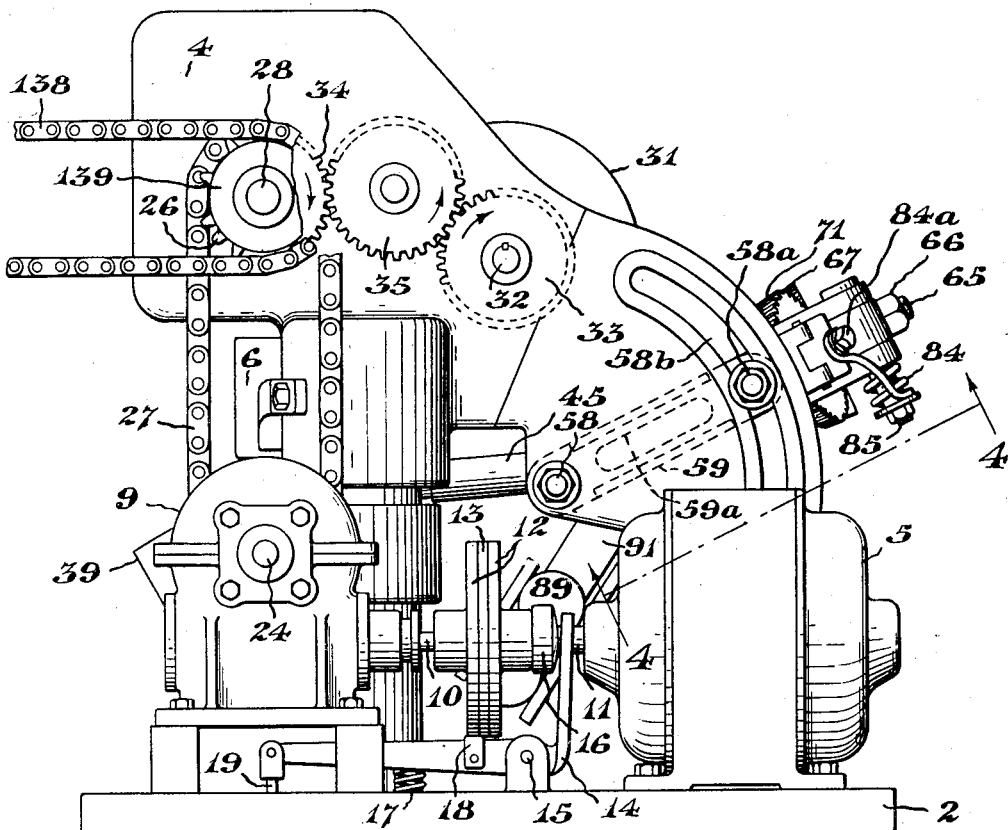
Fig. 3.
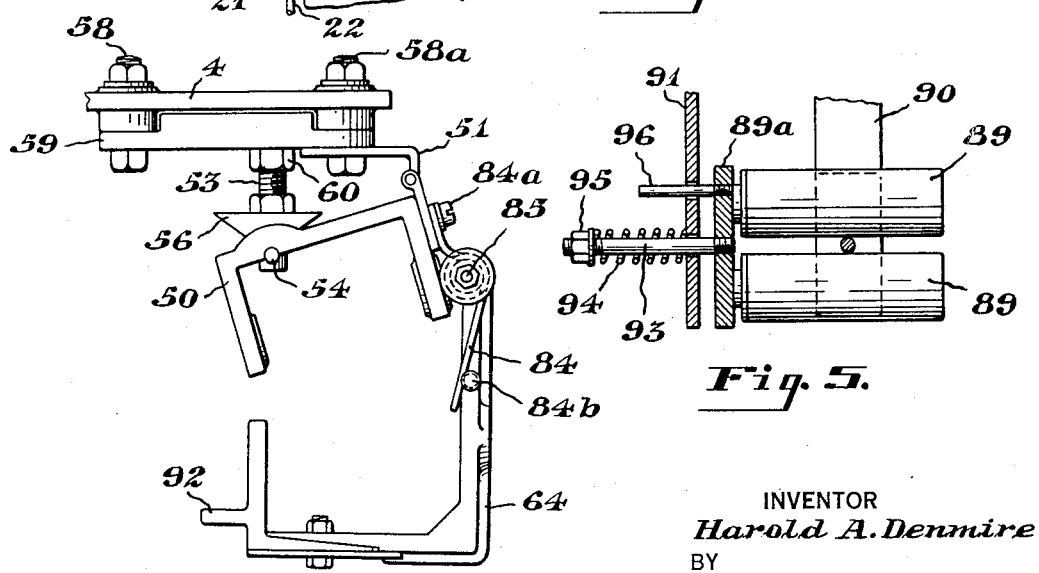
Fig. 4.
Fig. 5.
INVENTOR
Harold A. Denmire
BY
Evans McCoy
ATTORNEYS Oct. 24, 1933.                H. A. DENMIRE                 1,931,924
                           BEAD FLIPPER MACHINE
                           Filed Feb. 6, 1931              8 Sheets-Sheet 4
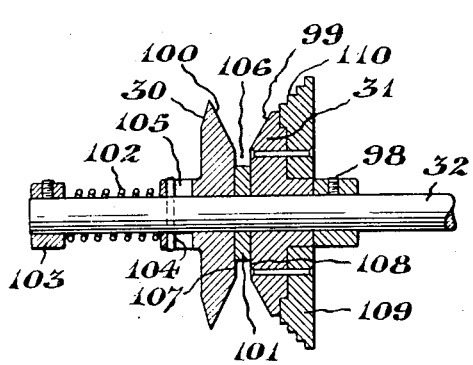
Fig. 6.
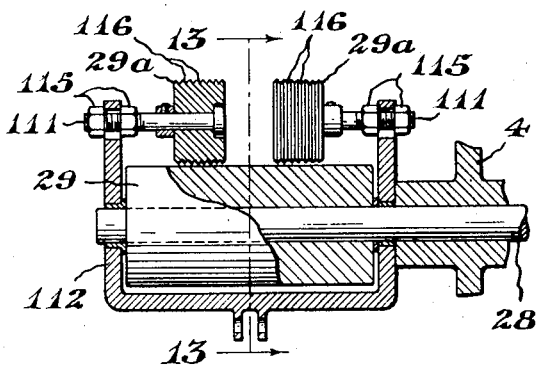
Fig. 7.
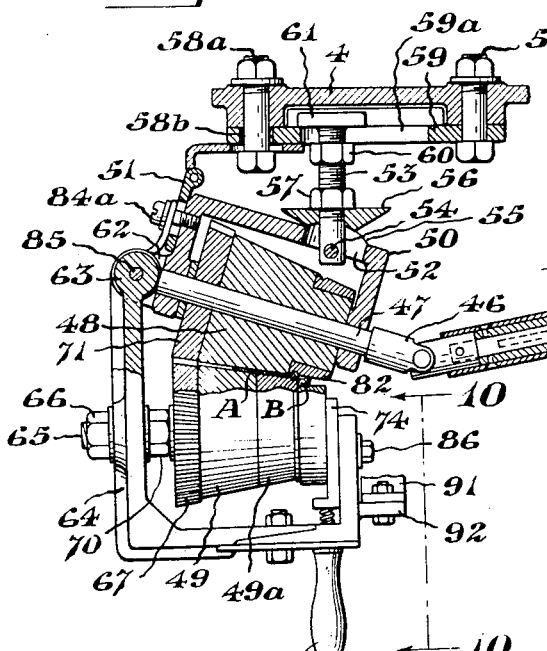
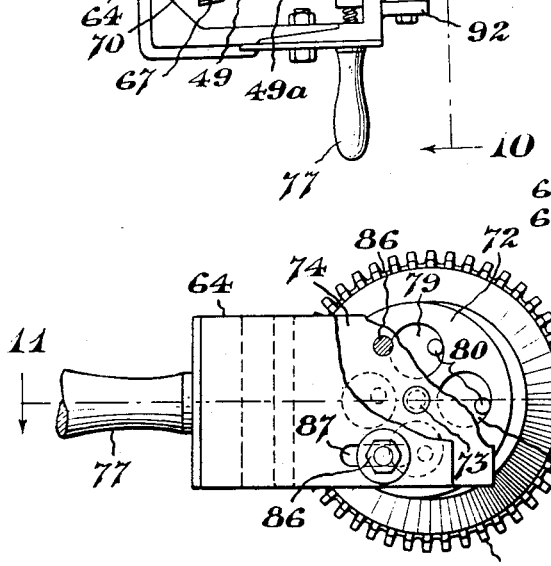
Fig. 10.
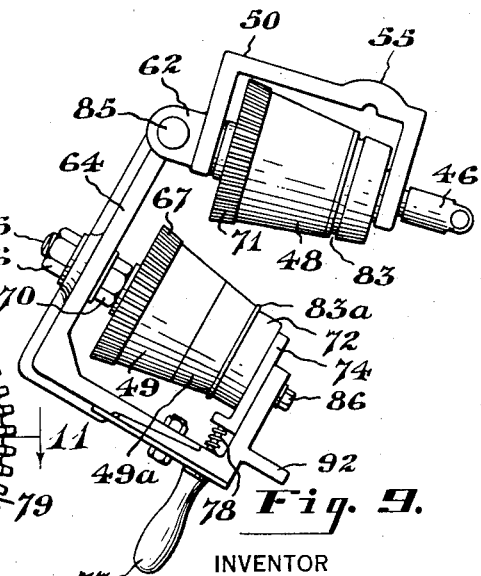
Fig. 9.
INVENTOR
Harold A. Denmire
BY
Evans + McCoy
ATTORNEYS Oct. 24, 1933.   H. A. DENMIRE   1,931,924
BEAD FLIPPER MACHINE
Filed Feb. 6, 1931   8 Sheets-Sheet 5
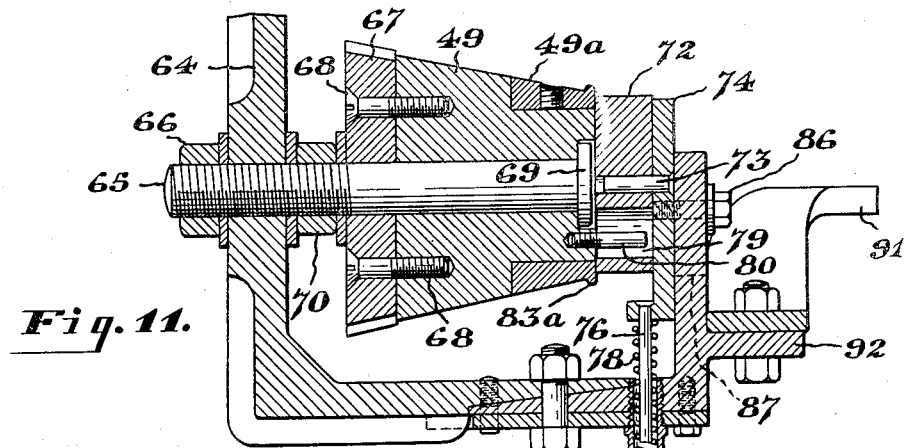
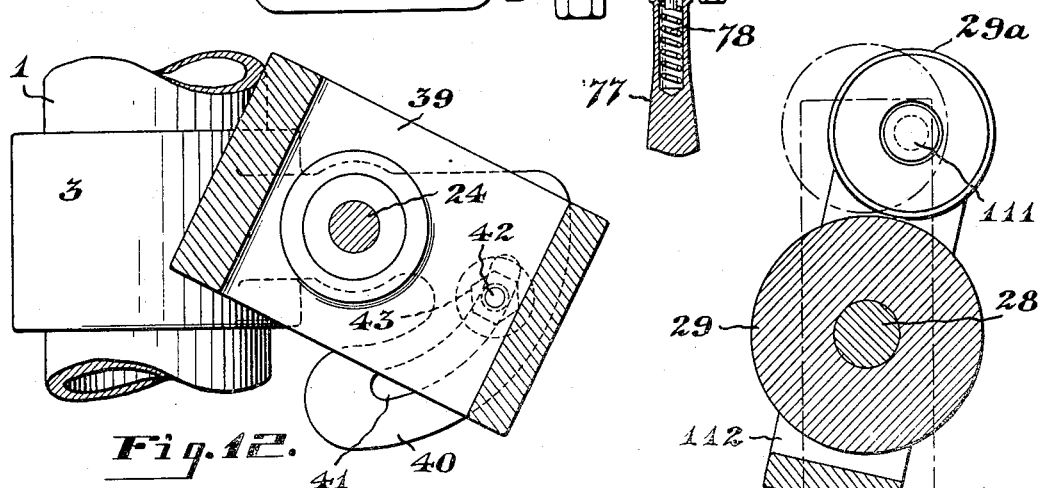
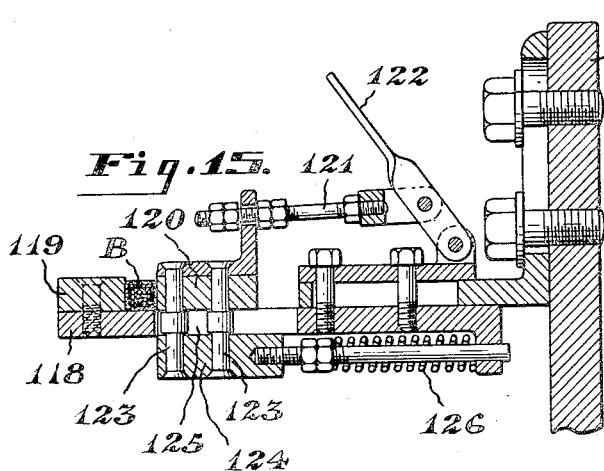
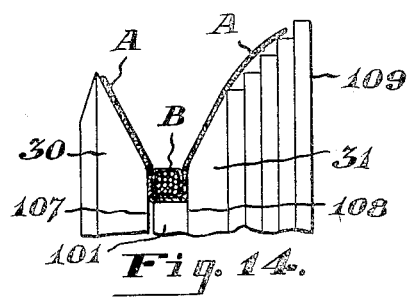
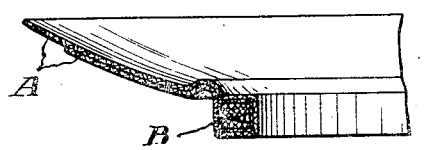
INVENTOR
Harold A. Denmire
BY
Evans & McCoy
ATTORNEYS Oct. 24, 1933.  H. A. DENMIRE  1,931,924
BEAD FLIPPER MACHINE
Filed Feb. 6, 1931   8 Sheets-Sheet 6
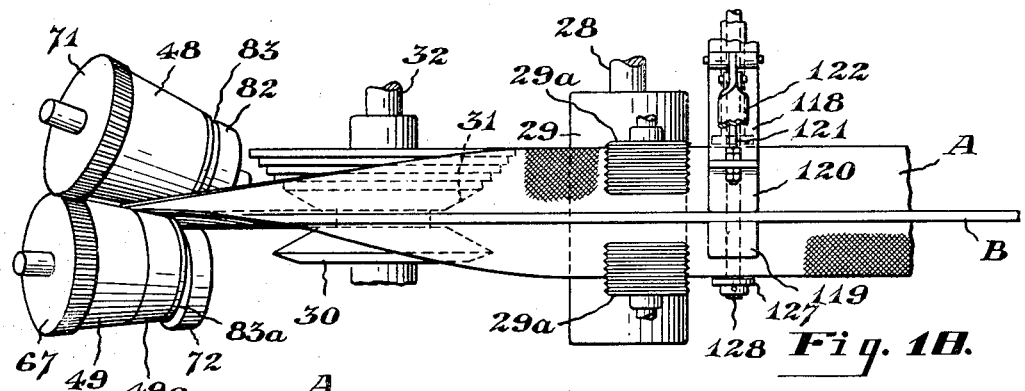
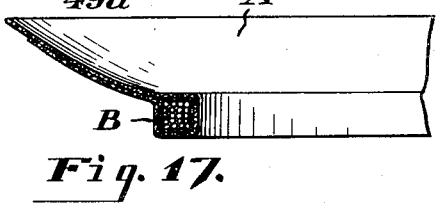
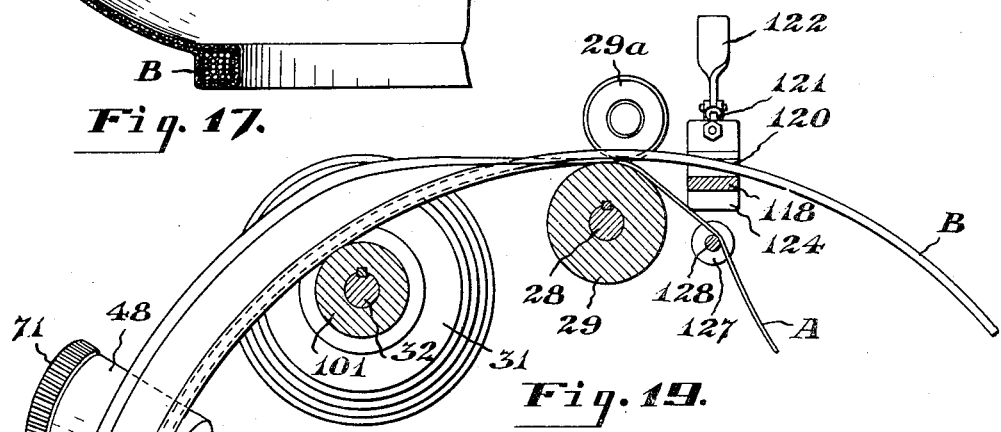
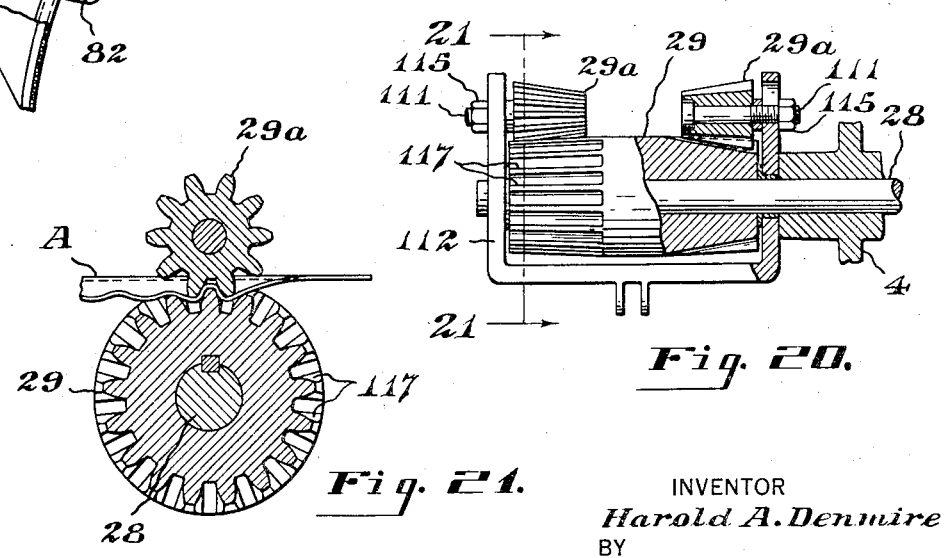
INVENTOR
*Harold A. Denmire*
BY
ATTORNEYS Oct. 24, 1933.  H. A. DENMIRE  1,931,924
BEAD FLIPPER MACHINE
Filed Feb. 6, 1931    8 Sheets-Sheet 7

INVENTOR
Harold A. Denmire
BY
Evans & McCoy
ATTORNEYS

Patented Oct. 24, 1933

1,931,924

UNITED STATES PATENT OFFICE 1,931,924

BEAD FLIPPER MACHINE

Harold A. Denmire, Akron, Ohio, assignor to The General Tire & Rubber Company, Akron, Ohio, a corporation of Ohio Application February 6, 1931. Serial No. 513,836

33 Claims. (Cl. 154—9)

This invention is a continuation in part of my application Serial No. 339,022 filed February 11, 1929, now Patent 1,871,119 issued Aug. 9, 1932, and relates to apparatus for applying flipper strips to bead cores used in the manufacture of pneumatic tire casings.

One of the objects of the present invention is to provide a new and novel apparatus for applying bead flipper strips to bead cores for pneumatic tire casings whereby bead flippers may be more accurately formed with a material saving in stock and whereby considerable time is saved in the applying of the flipper covered bead to the tire casing.

Another object is to provide improved apparatus for forming bead flippers for pneumatic tires wherein manual labor and the degree of skill required of the operator is reduced to a minimum.

Another object is to provide apparatus for forming bead flippers for use in the manufacture of pneumatic tire casings with mechanical means for automatically folding the flipper fabric around the bead core and during the folding process for automatically stretching the fabric a greater amount at its free marginal edges than at its central portion in order that the flipper strip may assume a true dished shape position.

A further object is to provide apparatus for forming bead flippers for use in the manufacture of pneumatic tire casings with means for simultaneously rotating a bead core and fabric covering therefor, for automatically folding the fabric covering around the bead core and increasingly stretching the fabric from the minimum amount adjacent the feed core to a maximum at the free marginal edges thereof, and at the same time automatically pressing the sides together to form a predetermined frusto-conical shaped flange surrounding the bead core.

A further object is to provide apparatus for forming bead flippers for use in the manufacture of pneumatic tires with automatic mechanical means for folding the intermediate portions of the flipper strip around the bead core and for forming the sides of the flipper strip to a desired predetermined dished shape.

With the above and other objects in view which will be clearly apparent from the following description, the present invention consists in certain features of construction and combinations of parts to be hereinafter described with reference to the accompanying drawings, and then claimed. In the drawings, Figure 1 is a front elevation of the bead flipper forming machine and the apparatus for supplying flipper fabric to the machine, the flipper fabric and bead core being shown in operative position on the machine;

Fig. 3 is an enlarged fragmentary rear elevation of the bead flipper forming machine shown in Figs. 1 and 2;

Fig. 4 is an enlarged section taken substantially on the line 4—4 of Fig. 3 showing the means for supporting a forming roll housing, the forming rolls being shown in operative position;

Fig. 5 is an enlarged section taken substantially on the line 5—5 of Fig. 1 showing the electromagnet means for holding the forming roll housing in cooperative position;

Fig. 6 is an enlarged section taken substantially on the line 6—6 of Fig. 1 showing the folding rolls;

Fig. 7 is an enlarged section taken substantially on the line 7—7 of Fig. 1 showing the feeding rolls;

Fig. 8 is an enlarged section taken substantially on the line 8—8 of Fig. 1 showing the driving means for the forming rolls and also partially showing the forming rolls in section;

Fig. 9 is a view showing the forming rolls and their supporting housings in non-operative position;

Fig. 10 is an end view of the movable forming roll and housing taken as looking in the direction of the arrows 10—10 in Fig. 8;

Fig. 11 is an enlarged section taken substantially on the line 11—11 of Fig. 10;

Fig. 12 is an enlarged section taken substantially on the line 12—12 of Fig. 8 showing the adjustable means for the housing which supports the driving gears for the forming rolls;

Fig. 13 is an enlarged section taken substantially on the line 13—13 of Fig. 7 showing the adjusting means for the feeding roll;

Fig. 14 is a fragmentary view of the folding rolls showing the same in operation of folding the flipper fabric about a bead core;

Fig. 15 is an enlarged section taken substantially on the line 15—15 of Fig. 1 showing the means for exerting a slight drag on the bead core during the forming operation;

Fig. 16 is an enlarged transverse section of a distorted bead flipper;

Fig. 17 is an enlarged transverse section of a finished bead flipper;

Fig. 18 is a diagrammatic view showing the feeding, folding and forming rolls in plan view and showing a bead flipper in the process of being formed;

Fig. 19 is a diagrammatic side elevation of the elements shown in Fig. 18;

Fig. 20 is a section through the modified types of the main and auxiliary feeding rolls;

Fig. 21 is a section taken on the line 21—21 of Fig. 20; and

Figure 1:
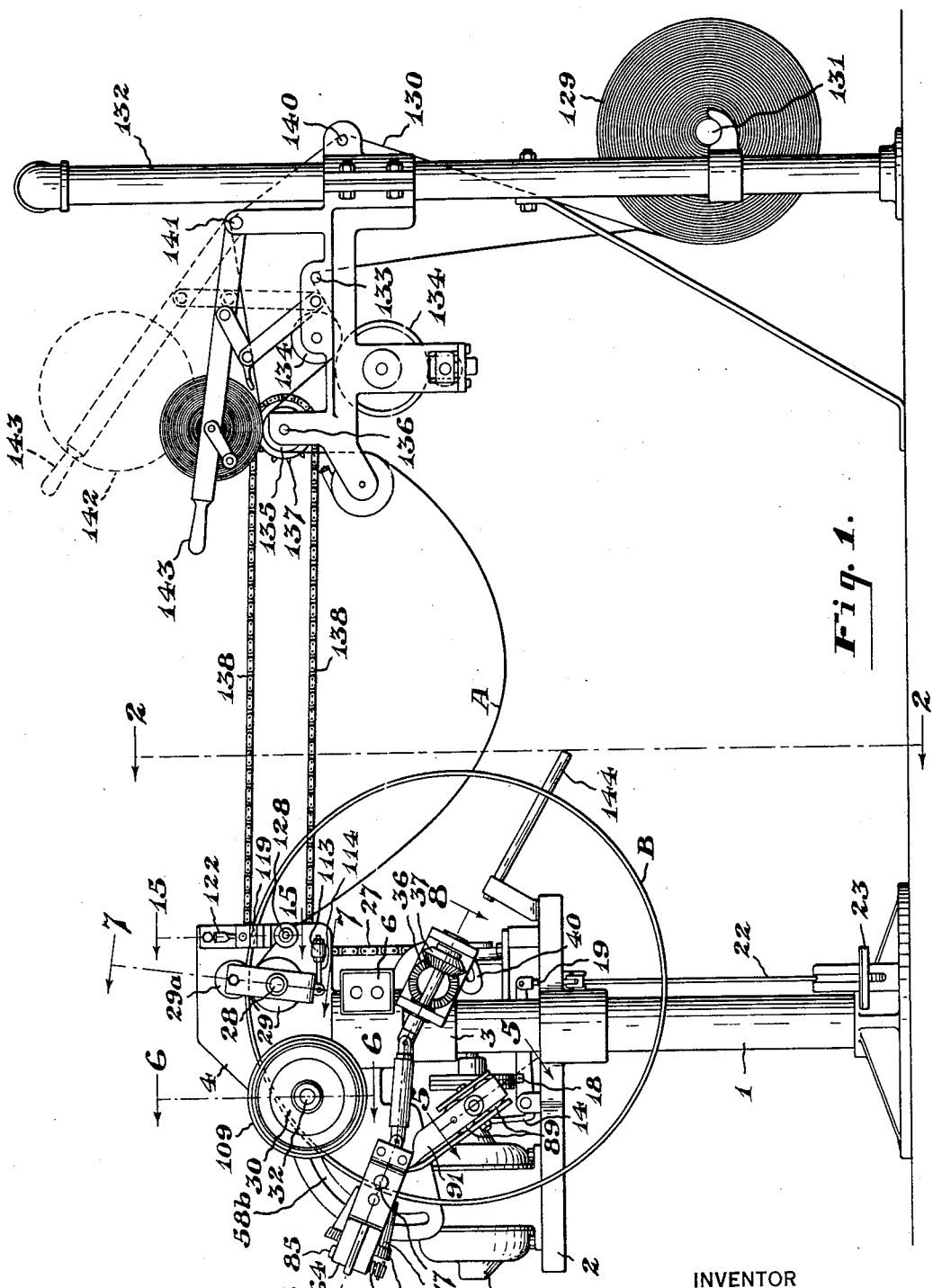

Figs. 22 to 28, inclusive, are sections of various types of forming rolls used in connection with the formation of different types of bead flippers.

A bead flipper for pneumatic tire casings comprises a core consisting of a plurality of metal wires coiled into a ring, sometimes embedded in rubber, and preferably enclosed within a fabric covering, and a strip of fabric folded around the core with one edge of the strip overlapping the other. When the tire carcass is built, the extending portions formed by the overlapped edges of the strip extend into and form a part of the wall of the tire carcass. When the flipper is in assembled position in the tire carcass the extending fabric portion of the flipper assumes a frusto-conical position, or in other words, has a dished appearance.

The methods employed heretofore in preparing bead flippers were slow, cumbersome and costly, partly because of the amount of manual labor involved and partly because of the failure to obtain a uniform satisfactory product. Furthermore, these methods have been unsatisfactory and inefficient because the bead flippers produced were not held to any specified shape and could not be easily assembled to the tire carcass during the manufacture of the tire. When the tire builder assembled these previously known flippers to the tire carcass, the fabric extending portions of the flippers, since they were improperly formed, would distort, would not remain in a satisfactory frusto-conical shape, and would, as a result of the distortion, become entangled with the other parts of the carcass.

It is, therefore, the purpose of the present invention to provide a new and novel apparatus whereby bead flippers can be produced easily and economically and whereby the flippers produced will be of the correct predetermined size and shape so that they can be easily assembled to the tire carcass with a minimum of time and labor.

Referring to the accompanying drawings in which like numerals refer to like parts throughout the several views, the apparatus used for forming the bead flipper comprises in general feeding rolls, fabric folding rolls, forming rolls and suitable mechanism for operating these several rolls, the operation of which will be later described. The entire structure is preferably supported on a column 1 having a base. The column 1 carries a motor support 2, a gear assembly supporting bracket 3 and a roll supporting bracket 4. Power for operating the apparatus is supplied by a motor 5 mounted on the support 2 and controlled from a starter switch 6 which is provided with the usual start and stop buttons.

Figure 2:
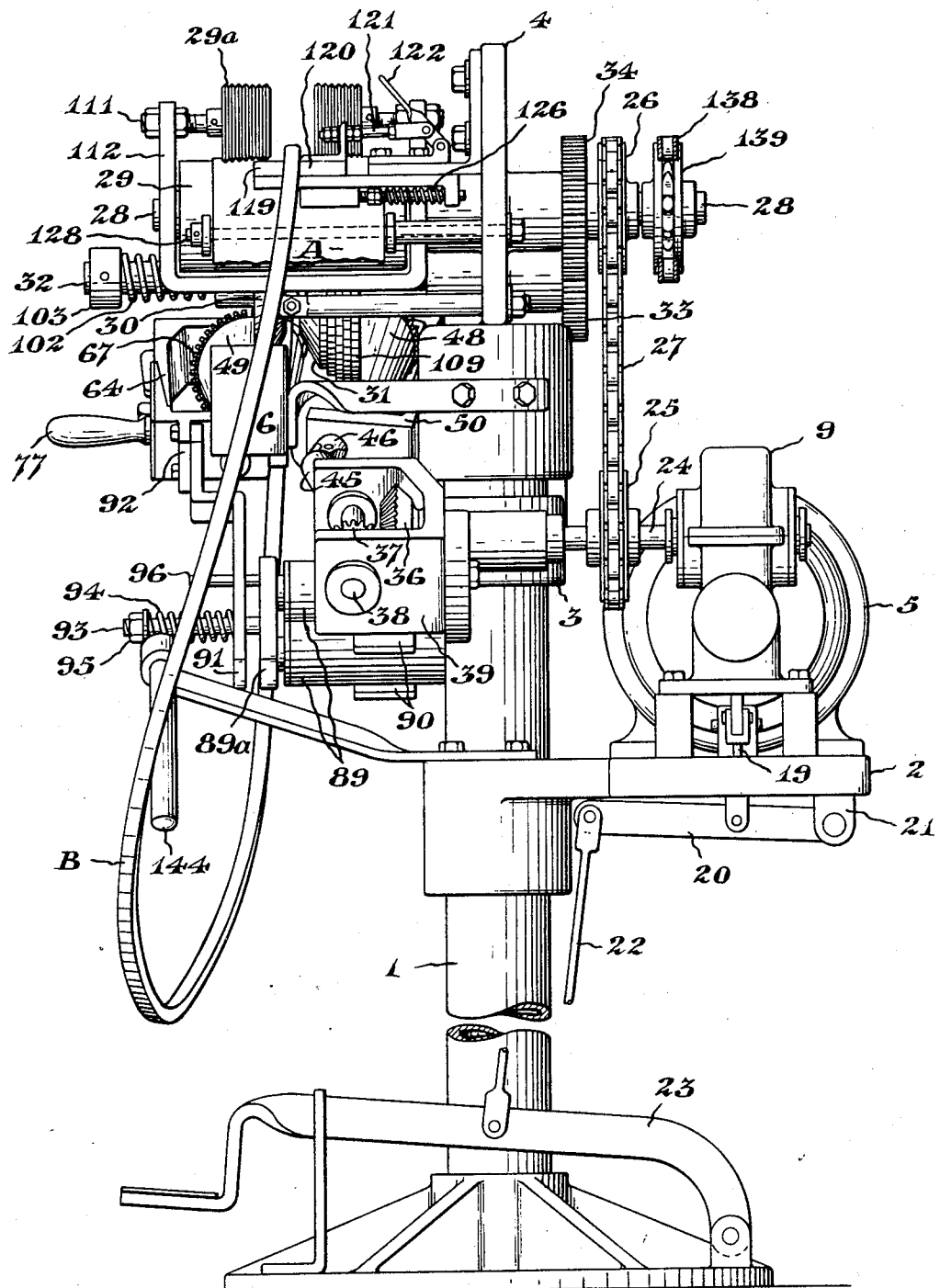
Fig. 2 is an enlarged end elevation of the machine as it appears from looking in the direction of the arrows 2—2 of Fig. 1.

Referring to Figs. 2 and 3, a housing 9 containing suitable reduction gears (not shown) is mounted upon a motor support 2 with the drive shaft 10 thereof in axial alignment with the drive shaft 11 of the motor 5. The shafts 10 and 11 are each provided with a section 12 of a suitable clutch coupling, and a friction pad 13 is positioned between the coupling sections 12 to transmit power from the motor shaft 11 to the reduction gear drive shaft 10. A bell crank 14 is pivoted by means of a pin 15 to the motor support 2 and this bell crank has one arm thereof in engagement with the thrust bearing 16 carried by the coupling section 12 mounted upon the motor shaft 11. A compression spring 17 is mounted between the other bell crank arm and the motor support 2 normally to force a brake pad 18 into engagement with the coupling section 12 mounted upon the reduction gear drive shaft 10. The last mentioned end of the bell crank arm is pivoted to one end of the rod 19 extending downwardly through the motor support 2, the other end of the rod 19 being pivoted to a horizontal lever 20 intermediate its ends.

One end of the lever 20 is hinged to a bracket 21 attached to the motor support 2, and the other end thereof is pivoted to a vertical rod 22 which is connected to a foot pedal 23 hinged to the supporting base of the column 1, as shown in Figs. 1 and 3. When the operator of the machine depresses the foot pedal 23 the bell crank 14 is pivoted through the medium of the linkage just described in such a manner that the brake pad 18 is moved away from the coupling section 12 mounted on the shaft 10, and the upwardly extending bell crank arm forces the coupling section on the motor shaft 11 to compress the friction shaft 13 to rigid engagement with the coupling section on the shaft 10, thereby causing the reduction gearing drive shaft to be driven by the motor 5.

The power is thus transmitted at reduced speed from the motor to the reduction gearing driven shaft 24 to drive the mechanism for forming the flipper bead.

A drive sprocket 25 is secured to the shaft 24 and drives a driven sprocket 26 through the medium of a link chain 27, which sprocket 26 is secured to the shaft 28 that extends horizontally through the roll supporting bracket 4 and which is rotatably supported therein. The shaft 28 extends through the bracket 4 to the operating side of the machine to drive the main feed roll 29 which is secured thereto.

In the construction shown in Figs. 7, 13 and 18, the main feed roll 29 is cylindrical throughout its length and extends outwardly from the bracket 4. The feed roll 29 in conjunction with the auxiliary rolls 29ª feeds the fabric A into folding rolls 30 and 31 at a definite speed, the operation of which will be described later in the specification.

The folding rolls 30 and 31 are mounted upon a shaft 32 that extends through the bracket 4 to the rear side thereof parallel to the shaft 28 and which has a spur gear 33 mounted thereon that is driven by a spur gear 34 mounted on the shaft 28 through the intermediary of an auxiliary idler gear 35. The idler gear 35 is provided to mesh with the gears 33 and 34 in order to cause the feed and folding rolls to rotate in the same counter-clockwise direction, as viewed in Figs. 1 and 19.

The shaft 24 which carries the drive sprocket 25 is journaled in the reduction gearing housing 9, and gear supporting bracket 3, and a bevel gear 36 is secured to the end of the same opposite the housing 9. This gear 36 meshes with a mating gear 37 secured to an inclined shaft 38 journaled in a U-shaped housing 39. The housing 39 is formed with an opening between the sides thereof through which the shaft 24 extends, and the gear 36 abuts against the web of the housing to prevent end play of the same, but with sufficient clearance that the housing may be rotated about the shaft 24 as an axis. The gear supporting bracket 3 is formed with an integral projecting quadrant 40 having a slot 41 therein substantially as shown in Fig. 12 through which a pin 42 threaded into the rear web face of the housing 39 extends.

A nut 43 is threaded on the end of the pin 42 so that the housing 39 can be clamped to the gear bracket 3.

Upon loosening the nut 43, the housing can be rotated through a substantial arc to vary the angular position of the shaft 38.

As shown in Fig. 8, one end of the shaft 38 projects beyond the housing 42 and is connected by a universal joint 44 to one end of an extensible shaft 45. The other end of the shaft 45 is universally connected by a joint 46 to the ends of a shaft 47 to which the forming roll 48 is secured, which, as will later be described, has a driving connection with the other forming roll 49. The ends of the roll shaft 47 are journaled in the legs of the U-shaped roll housing 50, the housing being supported at one end by a hinge member 51 movably secured to the roll supporting bracket 4. The other end of the housing 50 is formed with an enlarged opening 52 through which the end of the bolt 53 extends. A pin 54 fixed in the head of the bolt 53 perpendicular to the axis thereof engages the inner surface of the web of the housing 50. A semi-spherical boss 55 is formed on the outer surface of the housing 50 surrounding the opening 52. A collar 56 having a dished recess therein to engage the boss 55 is mounted upon the bolt 53 and the plane side thereof engages a lock nut 57 threaded on the bolt 53. The bolt 53 extends through a slot 59ᵃ formed in a plate 59 secured to the supporting bracket 4 and is held in adjusted position by the nut 60 and T head 61. The plate 59 is pivoted on a bolt 58 carried by the roll support 4 and is arranged to be swung in an arc about the bolt 58 as an axis. The opposite end of the plate can be set in any desired angular position by a bolt 58ᵃ which extends through an arcuate slot 58ᵇ in the bracket 4, the axis of the slot being that of the pin 58.

The hinge member 51 is secured to the roll supporting bracket 4 by means of the bolt 58ᵃ, as shown in Fig. 8, the slot in the hinge through which the bolt 58ᵃ extends being elongated.

Three adjustments are thus provided for the roll housing 51. By loosening the nut on the bolt 58ᵃ, the roll housing can be rotated in an arc in a direction transverse to the feeding and folding roll shafts to adjust the amount of stretch that is to be put into the extending portions of the flipper fabric. This, however, will soon be described in greater detail. By loosening the nut 60 the roll housing 50 can be swung in an arc transversely of the supporting bracket 4 within certain limits to adjust the angularity of the extending portions of the flipper strip relative to the bead core. The third adjustment is to adjust the forming rolls to accommodate different diametered bead flippers. This is accomplished by loosening the nut 60 and bolt 58ᵃ and bodily moving the roll housing 50 longitudinally of the plate 59.

Extending upwardly from one end of the housing 50 are hinged lugs 62 cooperating with corresponding lugs 63 on the roll housing 64 which carries the forming roll 49 for hingedly attaching the housing 64 to the housing 50. The housing 64 is similar in shape to the housing 51 and is preferably made in two pieces, as shown in Fig. 3. A stub shaft 65 is secured to the hinged leg of the housing 64 by means of a nut 66 for rotatably supporting the roll 49. The frustoconical forming roll 49 having a beveled gear 67 secured to the large end thereof by bolts or screws 68 is rotatably mounted on the stud shaft 65 and is held in position thereon by the enlarged head 69 of the shaft 65 and a spacer member 70.

The roll 49 is driven from the forming roll 48 by means of a gear 71 mounted on the roll 48 which meshes with the bevel gear 67 when the roll housings 64 and 50 are in closed position, and because the gears have the same fixed diameters the rolls 48 and 49 will rotate at the same relative speed. The end of the forming roll 49 is formed with a removable collar 49ᵃ for a purpose to be later described.

A cylindrical auxiliary forming roll 72 is rotatably mounted on a short stub shaft 73 carried by the slide 74 slidably engaging the inner face of the free leg of the housing 64. The slide 74 is provided with a pin 76 which extends into a hollow handle 77 secured to a portion of the housing 64, a compression spring 78 being provided in the hollow handle 77 to bear against the slide 74 to yieldably urge the auxiliary roll 72 into a position coaxial with the roll 49. The auxiliary roll 72, as shown in Fig. 8, bears against the small diametered end face of the roll 49 and has a plurality of circular openings 79 therein presenting toward the end face of the roll 49. A plurality of driving pins 80 having the same spacing as the opening 79 are secured to the small diametered end of the roll 49 to project into the openings 79.

The driving pins 80 are much smaller in diameter than the circular recesses 79 into which they extend, and consequently allow the auxiliary roll 72 to rotate eccentrically relative to the forming roll 49, the axes of the rolls 49 and 72 however remaining parallel. It is evident that for any amount of eccentricity the auxiliary roll 72 will rotate at the same speed as the roll 49 because of the engagement of the driving pins 80 with the walls of the circular openings 79. The slide 74 is held in sliding contact with the adjacent leg of the housing 64 by cap screws 86 which move in slots 87 formed in the leg of the housing. The screws being movable in the slots 87 permits lateral movement of the axis of the auxiliary roll 72. This movement, however, is yieldably resisted by the spring 78 positioned in the handle 77.

When the roll housings are in closed position, the fabric A of the bead flipper is positioned under tension between the roll 48 and auxiliary roll 72 substantially as shown in Figs. 8 and 18. The core B of the flipper which is of greater thickness than the fabric, forces the auxiliary roll 72 to assume an eccentric position against the pressure of the spring 78. The small end of the roll 48 is formed with a removable collar 82 having a circumferential recess 83 therein which receives a portion of the flipper strip during the forming operation. The operation of this recess in conjunction with a circumferential ridge 83ᵃ formed on the collar 49ᵃ of the roll 49, however, will be later described.

A torsion spring 84 is coiled around an extension of the hinge pin 85 which pivots the roll housing 64 to the housing 50 and has one end fixed in a clamp member 84ᵃ, as shown in Fig. 4, attached to the roll housing 50, the other end of the spring 84 being seated against a stud 84ᵇ carried by the roll housing 64. This spring 84 maintains the forming roll housings in their normal open position, as shown in Fig. 9.

The roll housing 64 is held in operative position against the torsion of the spring 84 by the action of electromagnets 89 with an armature 89a as shown in Fig. 5, the electromagnets being mounted on the roll supporting bracket 4 by suitable clamping arms 90, the armature 89a being yieldably mounted on an arm 91 carried by a lug 92 formed on the roll housing 64. The armature 89a, as more clearly shown in Fig. 5, is carried by a stud 93 extending through an opening in the arm 91, and has the spring 94 thereon compressed by a nut 95 threaded on the end of a stud 93. The nut 95 may be threaded inwardly or outwardly to adjust the pressure of the spring 94. A pin 96 carried by one end of the armature 89a slidably extends through the arm 91 to prevent rotation of the armature 89a.

The electromagnets 89 are positioned in such a manner that when the roll housing 64 is manually moved to closed position, and when the electromagnets are energized, the armature 89a is attracted by the electromagnets 89 and makes contact therewith. Since the armature is yieldably mounted on the arm 91 pressure is thus exerted between the forming rolls 48 and 49 as previously mentioned. The push button switch for controlling the circuit to the motor is also connected into the electric circuit which energizes the electromagnets 89, so that when the circuit is opened by depressing one of the buttons the electromagnets are de-energized, thereby releasing the contact with the armature 89a. The torsion spring 84 then causes the roll housing 64 to swing to its open position.

The folding roll 31 is mounted on the shaft 32 so that it can be adjusted longitudinally of the same, and is provided with a set screw 98 threaded into the hub thereof and adapted to engage the shaft 32 in order to set the roll 31 in any predetermined position. This roll is formed with a frusto-conical outwardly presenting face 99. The folding roll 30 is slidably mounted on the shaft 32 and is likewise formed with a frusto-conical face 100 presenting toward the face 99 of the roll 31. The rolls 30 and 31, as shown in Fig. 6, face each other to provide a generally V-shaped notch therebetween. Interposed between the rolls 30 and 31 is a bead driving cylinder 101 which is keyed to the shaft 32.

The folding roll 30 normally abuts against the cylinder 101 and is held in yieldable abutting relation therewith by means of a compression spring 102, one end of which engages the end of the hub of the roll 30 and the other end of which engages a collar 103 securely mounted on the end of the shaft 32. The roll 30 is driven by means of a pin 104 extending transversely of the shaft 32 which engages the side walls of transverse notches 105 formed in its hub.

It can thus be seen that the pin 104 provides a positive driving means for the roll 30 and still allows sliding movement of the same longitudinally of the shaft 32. The frusto-conical faces 99 and 100 of the folding rolls 30 and 31, respectively, form a generally V-shaped groove around their circumference, the bottom of which does not come to a point but has a supplementary groove 106 of rectangular shape defined by the smaller diametered bases 107 and 108 of the rolls 30 and 31, and the surface of the bead driving cylinder 101. The width of the groove 106 will, of course, vary depending upon the relative positions of the rolls 30 and 31 on the shaft 32. The main purpose of the spring 102 is to force the roll 30 toward the roll 31 so that sufficient tractive effort will be exerted on the core B and fabric A to fold the fabric around the inner and side faces of the core and to allow the fabric to assume a substantial V-shape, as shown in Fig. 14.

The primary function of the cylinder 101 is to provide a positive driving means for the bead core and fabric folded therearound. This folding action will be more fully described later in the specification. The shape of the groove 106 does not necessarily have to be rectangular but may be of any desired shape. This, of course, depends somewhat upon the shape of the bead core used in the bead flipper.

A collar 109 is secured to the folding roll 31 and is provided with a stepped face 110 forming a substantial continuation of the face 100 of the roll 31 which operates, as will be later described, when relatively wide flipper strips are employed.

The rolls 29a which operate in conjunction with the main feed roll 29 are mounted in coaxial spaced relation on short stub shafts 111 carried by a U-shaped bracket 112. The bracket 112 is pivotally supported on the main roll drive shaft 28 and is provided with a suitable adjusting means for changing the radial position of the rolls 29a with respect to the main feed roll 29. This adjusting means may comprise, as shown in Fig. 1, a boss 113 carried by the roll supporting plate 4 and a screw 114 mounted in the boss 113 for adjustment relative thereto, the screw 114 being pivoted to the bracket 112. By adjusting the screw 114, the bight of the rolls 29 and 29a on the flipper fabric can be adjusted relative to the contact of the flipper bead core with the flipper fabric, as shown in Fig. 13. The auxiliary feed rolls 29a are each so mounted on their stub shafts 111 that they can be axially adjusted thereon in order to provide the proper spacing between the rolls 29a for different widths of fabric employed in making different sizes of bead flippers. This is accomplished by providing a nut 115 at each side of each leg of the bracket 112.

Each auxiliary feed roll 29a is formed with a plurality of circumferentially arranged grooves 116 which, when the machine is in operation, permits the excess fabric to gather between the conical puller points of contact of the rolls 29a with the roll 29, and thus prevent excessive crowding of the flipper fabric ahead of the bead core.

By employing the adjustment of the auxiliary feed rolls just described and the circumferential gathering grooves, the device can be arranged so that the bight of the feed rolls on the fabric is just ahead of the point where the flipper fabric engages the inner face of the bead core that is being covered. The device can thus be adjusted for different degrees of gathering in of the flipper fabric at the inner face of the bead core.

Modified types of feed roll 29 and auxiliary feed rolls 29a are shown in Fig. 20. In these modified types the main feed roll 29 is made slightly conical at its ends and is formed with flutes or substantial gear teeth 117, which engage with corresponding teeth on the auxiliary feed rolls 29a, the rolls 29a being of frusto-conical shape. The function of these modified rolls is substantially the same as the previously described type. These rolls gather the flipper fabric in such a manner that it is materially stretched at its edges and also crowded in along the inner face of the bead core to provide a very smooth lay of the flipper fabric along the inner face of the bead core.

The bead core, being covered, is supported in advance of the feed roll 29 on an extending arm 118 carried by the roll support 4. This arm has a guide block 119 rigidly mounted thereon for guiding the bead core centrally of the feed roll 29. A slight drag is exerted on the bead core by resiliently holding it against the guide block 119. This is accomplished by means of an auxiliary block 120 slidably mounted on the arm 118 and connected through a link 121 to a manually operable lever 122. The slidable block 120 is mounted on the upper side of the arm 118 and is connected by means of pins 123 to a bar 124 positioned below the arm 118, the pins 123 being guided in a slot 125 in the arm 118. The bar 124, and consequently the block 120, are resiliently urged toward the block 119 to lightly grip the bead core by means of a coil spring 126 acting against the bar 124. By actuating the lever 122 against the spring pressure, the drag on the core can be relieved.

The flipper fabric A, being fed to the feed roll 29, passes over and is guided by a guide roller 127 that is mounted on a pin 128 carried by the roll support 4.

The fabric forming the flipper strip is supplied to the machine in a continuous strip wound around a spool 129. The layers of fabric, which are frictioned on one side, are separated by a suitable continuous separator strip 130 which prevents the fabric layers from sticking together.

The spool 129 for the flipper fabric is rotatably suported on a shaft 131 carried by a frame 132. The fabric, as it is being unwound from the spool 129, passes over a spindle 133 and then passes between a pair of pressure rolls 134, one of which is preferably arranged to print the size of the bead flipper on the flipper fabric. From these rolls 134, the fabric then is led over a roll 135 and then to the flipper applying apparatus, the roll 135 being keyed to a rotatable shaft 136. The shaft 136 is provided with a sprocket 137, which is driven by means of a suitable drive belt or chain 138 from a sprocket 139 mounted on the feed roll drive shaft 28.

The separator strip 125, as the fabric is being unwound, passes over spindles 140 and 141 and is wound around a roll 142 which is rotatably mounted on the end of a pivoted lever 143. The roll 142, with the separator strip wound thereon, normally rests on and is rotated by the roll 135. The roll 142 is of sufficient weight to prevent slippage of the flipper fabric passing over the roll 135 and to thereby cause the material to be unwound from the spool 129. It is possible in this way to provide sufficient slack between the spool and flipper forming apparatus, as shown in Fig. 1.

In the operation of the bead forming apparatus of the present invention, the roll housing is swung outwardly to the position shown in Fig. 9, and the bead core B is then placed in position on the main feed roll 29, between the parallel faces of the folding rolls 30 and 31, between the guide blocks 119 and 120, and the current supply for the electromagnets 89 and motor is turned on by operating the switch 6, at which time the roll housing 64 is moved back to its operating position shown in Fig. 8. The electromagnets 89 then hold the housing 64 in position until the flipper bead is completed and the current turned off. In this position the bead core is gripped between the auxiliary portion 82 of the forming roll 48 and the resiliently mounted auxiliary forming roll 72.

The free end of the flipper fabric A is next passed over the guide roller 127 and then between the feed rolls 28 and 29 and underneath the bead core B. The bead core is held out of contact with the edge of the fabric being fed to the machine by means of a suitable guide bar 144, as shown in Figs. 1 and 2.

The apparatus is then placed in operation by depressing the foot pedal 23, which causes the clutch plates to engage and cause the feeding, folding and forming rolls to be set in rotation through the medium of the gearing previously described.

The action of the various feeding, folding and forming rolls is illustrated in Figs. 18 and 19. Operation of the apparatus causes the bead core and fabric to rotate about an imaginary center which would be approximately at the apex of the axes of the conical forming rolls 48 and 49.

The flipper strip A is fed into the machine over the guide roller 127 and the core B is guided centrally over the main feed roll 29 by the guide blocks 119 and 120, the core being arranged to substantially engage the friction side of the flipper strip passing over the main feed roll 29 underneath the core B.

Prior to contact between the flipper strip and bead core, the bight of the feed rolls 29 and 29a occurs which, because of the spaced puller points, gathers the side portions of the flipper strips which are not wrapped around the cores, and thus prevents gathering-in of the flipper strip at the inner circumferential face of the bead core.

The flipper strip and core then pass to the folding rolls 30 and 31, where the strip is folded about the lateral sides and inner edge of the core. This folding action is obtained by the contact of the flipper strip and core with the driving cylinder 101, and the parallel faces 107 and 108 of the folding rolls 30 and 31, the roll 30 which is yieldably mounted for axial movement exerting sufficient lateral pressure to firmly grip the flipper strip and core in a lateral direction.

The diameter of the feed roll 29 is made slightly greater than the diameter of the driving cylinder 101 between the folding rolls so that the peripheral speed of the same is slightly more than the peripheral speed of the cylinder 101. The result is that the flipper strip on the way to the folding rolls 30 and 31 travels at a slightly higher rate of speed than the core. Because of this difference in speed and the drag on the core, the flipper strip as it leaves the folding rolls on its way to the forming rolls 48 and 49 assumes a substantial V shape above the core, the sides of the flipper strip lying against the divergent faces 99 and 100 of the folding rolls 30 and 31.

The gearing is so arranged that the peripheral speed of the forming rolls 48 and 49 and the auxiliary roll 72 adjacent to the core passing therebetween is practically the same as the peripheral speed of the portions of the forming rolls adjacent to the core.

The forming rolls as previously described are frusto-conical in shape and revolve about intersecting axes and are also positioned so that a plane passing through the substantial adjacent faces of the same is inclined to the vertical—that is this is not perpendicular to the axis of the bead flipper being formed. It is therefore evident that as the diameters of the forming rolls are increased the peripheral speeds thereof are increased. The speed of the outer edges of the unfolded portions of the flipper strip passing between the forming rolls is greater than the speed of the core and the portions of the flipper strip folded around the core. In other words the speed of the unfolded portions of the strip is progressively increased outwardly from the core. The result is readily apparent, as it can be seen that the strip is stretched in an angular direction by the forming rolls and is stretched in increasingly and progressively greater amounts as the diameter is increased. It is desirable that the strip be stretched a maximum amount at the points of greatest diameter so that the flange formed by the engaged flaps of the strip will assume a true and substantially permanent frusto-conical appearance and will not distort subsequent to its application to the tire casing being constructed.

The auxiliary forming roll 72 being in an eccentric position, together with the edge of the roll 49, substantially completes the folding operation by wrapping the fabric around the outer circumferential face of the core leaving the two flaps which are pressed together by the main portions of the forming rolls and which adhere to each other.

Since these flaps are stretched a maximum amount at their outer edges they retain the shape they had while passing between the forming rolls,—that is, they assume the frusto-conical shape shown in Fig. 17.

The groove 83 formed on the counter portion 82 of the forming roll 48 and the cooperating ridge formed on the corresponding counter portion 49$^a$ of the forming roll 49 crowd the strip during the forming action laterally on the core away from a corner thereof, substantially forming it to the shape shown in Fig. 16, so that when the bead flipper leaves the forming rolls the flaps will be positioned in smooth outline at one side of the core as shown in Fig. 17. This in fact provides an over correction in the application of the flipper strip to the core which results in a smooth face.

Any desired degree of overlapping of the flaps of the flipper strip is obtained by adjusting the lateral position of the guide spool 127 which will place the unfolded strip in the correct position relative to the core.

Any desired degree of stretch in the overlapping flaps of the flipper strips can be obtained by adjusting the housing 50 to obtain the necessary lateral position of the rolls 48 and 49 to meet that condition, and furthermore, the angle of the overlapping flaps relative to the bead core can be easily obtained by changing the angular position of the housing 50 relative to a vertical plane, as previously described.

When the bead core is nearly covered, the flipper strip is cut and the rotation of the bead flipper is stopped, at which time the end of the flipper strip is overlapped with the end thereof first applied to the core, and the machine is then again set in operation and allowed to operate until the core is completely covered, at which time the rotation of the bead flipper is stopped and the push button 6 is released to break the circuit in order to de-energize the electromagnet and allow the housing 64 to swing to its open position.

The resultant bead flipper which is then moved from the flipper machine will retain its desired true frusto-conical shape because the overlapping flap has been progressively stretched from a minimum adjacent the core to a maximum at the points of greatest diameter. The advantages are evident, since the flaps of the flipper cannot inadvertently move out of their inclined positions because of the progressive stretching to which they have been subjected.

In Figs. 22 to 28 there are shown various modifications of the forming rolls which have been designed to meet various conditions such as different shaped bead cores, the position at which the overlapping flap extends away from the bead core, and the like.

In each of these figures the numeral 150 represents the main forming roll, the numeral 151 represents the idler forming roll to which an eccentric auxiliary forming roll 152 is attached, the numeral 153 represents the removable core engaging collar attached to the main forming roll 150, and the numeral 154 represents the collar 49 attached to the idler forming roll 151.

Figure 22:
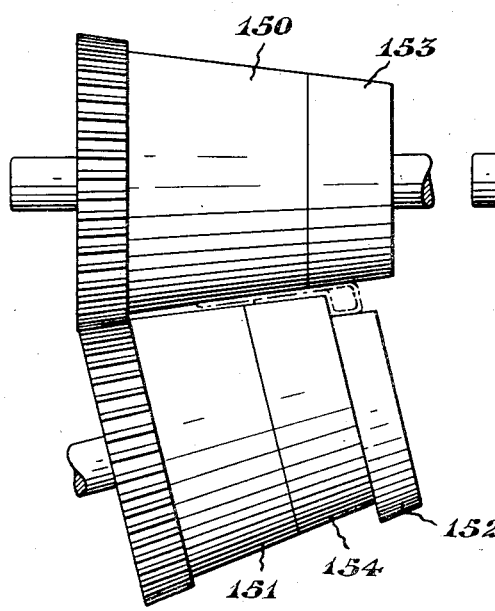

In Fig. 22 the auxiliary forming roll 152 is of the same shape as the auxiliary roll 72 previously described, and the core engaging collar 153 is not grooved but is formed with a plane surface which is an unbroken continuation of the surface of the main roll 150. The ridge 83$^a$ is also omitted from the idler roll collar 49$^a$.

Figure 23:
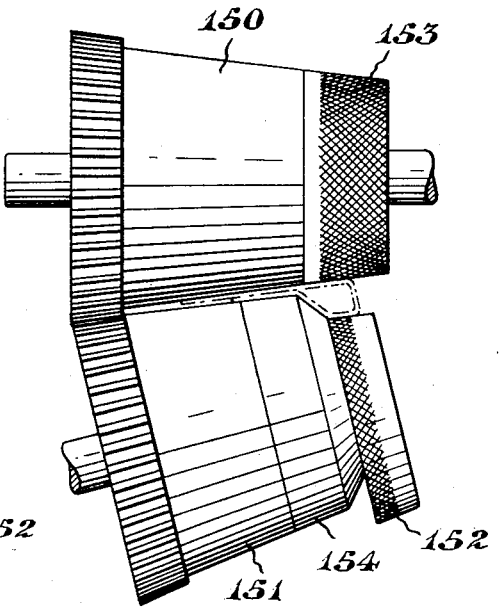
Figure 25:
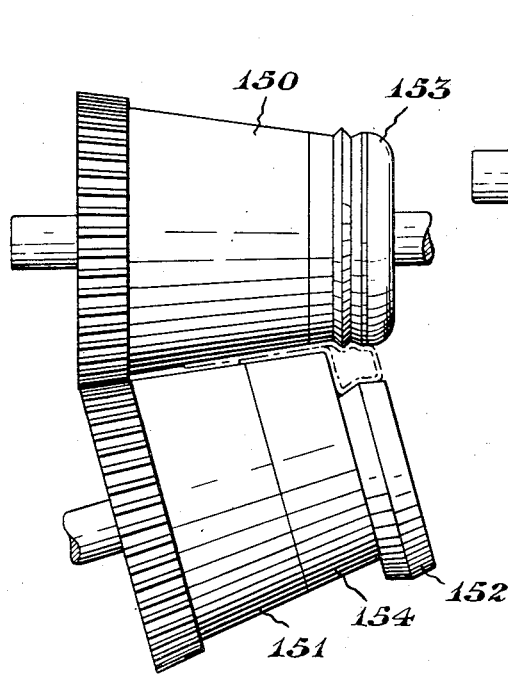
Figure 24:
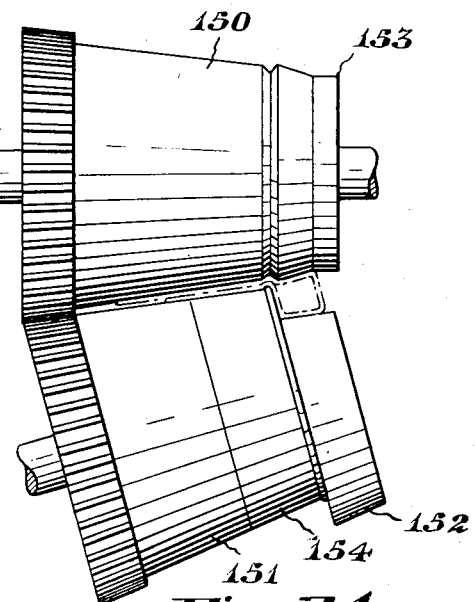
Figure 26:
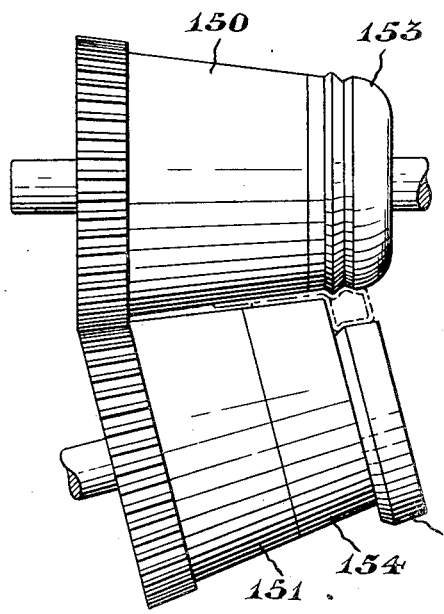
Figure 27:
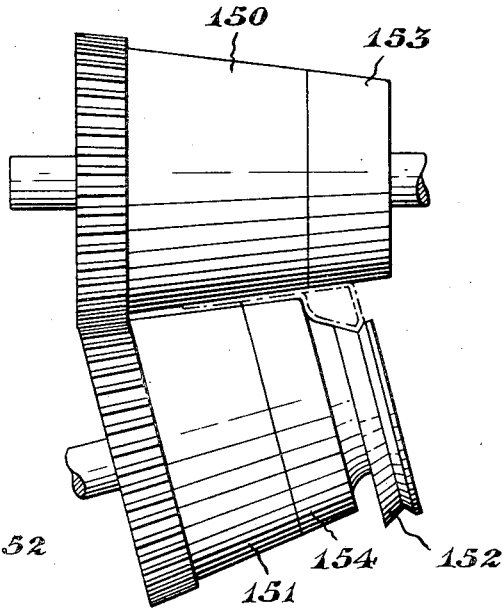
Figure 28:
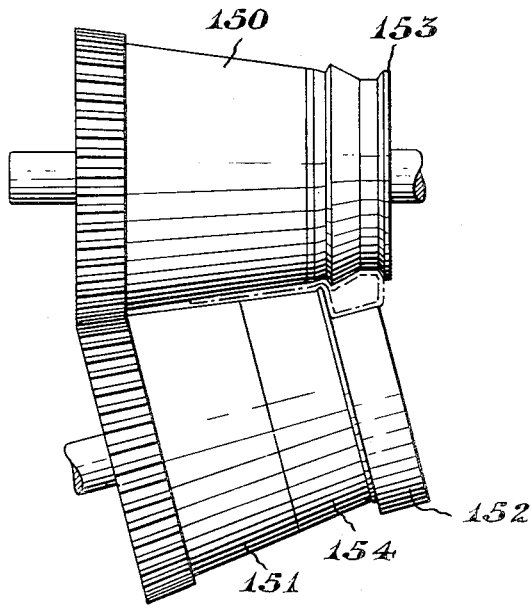

In Fig. 23 the core portion 153 of the main roll shown in Fig. 8 is knurled and the auxiliary roll 152 is also knurled. In this case, however, the edge of the auxiliary roll is spaced from the smaller diametered end of the roll 151, the abutting lateral face of the auxiliary roll 152 being of greater diameter than the corresponding face of the roll 151.

In each of the remaining Figures 24 to 28 the object of the different shapes of the auxiliary rolls 152 and the collar portions 154 and 153 of the main forming rolls is self-evident, and does not need detailed explanation. In each case the collars 153 and 154 are removable as previously described, in connection with the rolls 48 and 49.

It is apparent from the drawings and foregoing description that bead flippers may be formed by the apparatus of my invention to uniform and correct predetermined shape, and that they can be produced easily and economically with a minimum of manual labor and in a relatively short time.

Aside from the specific embodiments of the invention herein shown and described, it will be understood that numerous details of construction may be altered or omitted without departing from the spirit and scope of this invention, and that it is not desired to limit the invention to the exact construction herein set forth. I desire to claim the invention broadly as well as specifically, as indicated in the appended claims.

What I claim is:

1. In an apparatus for forming bead flippers having a fabric covered core, the fabric being extended beyond the core, a pair of frusto-conical forming rolls, means for rotating said rolls at the same speed, and an auxiliary forming roll eccentrically driven by one of said first rolls for yieldingly holding the bead portion of said bead flipper against the other of said first rolls to rotate said bead flipper, said first forming rolls being engageable with the extended fabric portion of said flipper to form said extended fabric portion at an angle to the axis of the bead portion of said bead flipper.

2. In a pair of frusto-conical forming rolls for substantially permanently positioning the fabric of a bead flipper at an angle to the axis of the core of the same, an auxiliary forming roll eccentrically driven by one of said first rolls for yieldably and frictionally holding the bead portion of said bead flipper against the other of said first forming rolls to rotate said bead flipper.

3. In a pair of frusto-conical rolls for forming the fabric of a bead flipper at an angle to the axis of the core of the same, an auxiliary forming roll eccentrically driven by one of said rolls, and spring means adapted to move said auxiliary roll to frictionally engage said bead core between said auxiliary roll and the other of said forming rolls to rotate said core.

4. In an apparatus for forming bead flippers, a pair of rotatable frusto-conical rolls for stretching and forming the fabric of a bead flipper at an angle to the axis of a bead core, an auxiliary forming roll positioned to move laterally of one of said rolls, driving pins on said last mentioned roll adapted to engage said auxiliary roll and eccentrically rotate the same, and spring means yieldably resisting lateral movement of said auxiliary roll arranged to force said auxiliary roll toward the other of said rolls for frictionally engaging said fabric and bead core between said auxiliary roll and the other of said forming rolls to thereby rotate said bead core.

5. In an apparatus for forming bead flippers, a pair of frusto-conical forming rolls disposed at an angle to the axis of a bead core capable of receiving a flipper strip therebetween to stretch and form said strip at an angle to the axis of said core, an auxiliary forming roll yieldably movable laterally of said rolls in a plane through the axes thereof, said auxiliary roll having a plurality of spaced openings therein, a plurality of spaced pins carried by one of said forming rolls and extending into said apertures for eccentrically driving said auxiliary roll, and resilient means resisting lateral movement of said auxiliary roll adapted to force said auxiliary roll toward the other of said forming rolls for rotating said bead core.

6. In a device for simultaneously pressing the sides of a bead flipper together and for increasingly stretching the same from a minimum amount adjacent the bead core to a maximum at the free marginal edges thereof, comprising a roll housing, a frusto-conical forming roll rotatably mounted in said housing, a second roll housing pivoted to the first mentioned roll housing, a second forming roll rotatably mounted in the second roll housing, said rolls having their axes converging toward each other and intersecting at a point disposed away from the axis of the bead core, driving connections between said forming rolls, releasable means to hold said roll housings in closed operative position, and spring means adapted to hold said roll housings in open inoperative position.

7. In a device for simultaneously pressing the sides of a bead flipper together and for increasingly stretching the same from a minimum amount adjacent the bead core to a maximum at the free marginal edges thereof, comprising a roll housing, a frusto-conical forming roll rotatably mounted in said housing, a second roll housing pivoted to the first mentioned roll housing, a second forming roll rotatably mounted in the second roll housing, driving connections between said forming rolls, spring means for normally holding said roll housing in open position, and magnetic means adapted to hold said roll housings in closed operative position against the resistance of said spring means.

8. In a device for simultaneously pressing the sides of a bead flipper together and for increasingly stretching the same from a minimum amount adjacent the bead core to a maximum at the free marginal edges thereof, comprising a roll housing, a frusto-conical forming roll rotatably mounted in said housing, a second roll housing pivoted to the first mentioned roll housing, a second forming roll rotatably mounted in the second roll housing, driving connections between said forming rolls, an auxiliary forming roll slidably mounted on said second housing adjacent to the small diametered end of said second roll and eccentrically driven thereby, resilient means carried by said second housing for resisting the sliding movement of said auxiliary roll, magnetic means capable of holding said roll housings in closed position for operation of said forming rolls, and means for driving one of said forming rolls.

9. In an apparatus for forming a bead flipper having a flipper strip folded around a bead core, means for simultaneously pressing the sides of said strip extending beyond said core together and increasingly stretching said sides from a minimum amount adjacent to said core to a maximum at the free edges thereof, said means comprising a pair of frusto-conical forming rolls for receiving the sides of said flipper strip between the conical faces thereof, an auxiliary roll eccentrically driven by one of said rolls capable of forcing said bead core against the other of said rolls to rotate said bead core, and means for rotating said rolls.

10. In an apparatus for forming a bead flipper having a flipper strip folded around a bead core, means for simultaneously pressing the sides of said strip extending beyond said core together and increasingly stretching said sides from a minimum amount adjacent to said core to a maximum at the free edges thereof, said means comprising a pair of frusto-conical forming rolls for receiving the sides of said flipper strip between the conical faces thereof, an auxiliary roll eccentrically driven by one of said rolls capable of forcing said bead core against the other of said rolls to rotate said bead core, and means for rotating said rolls, one of said forming rolls having a circumferential groove therein and the other of said forming rolls having a circumferential ridge thereon operating with said groove for distorting said flipper strip adjacent said bead core during the forming operation, whereby said strip will smoothly extend from said core in an angular plane.

11. In an apparatus for forming a bead flipper having a flipper strip folded around a bead core, said strip extending outwardly from said core at an angle inclined to the axis of said core, means for simultaneously pressing the sides of said strip extending beyond said core together and increasingly stretching said sides from a minimum adjacent said core to a maximum at their free edges, said means comprising a pair of rotatable frusto-conical forming rolls for frictionally engaging the extending sides of the flipper strip between the conical faces thereof, the faces of said rolls engaging said extending sides being inclined relative to the axis of said core, an auxiliary roll eccentrically driven by one of said rolls capable of forcing said bead core against the other of said rolls to rotate said bead, means for rotating said rolls, and means for bodily shifting said rolls relative to the axis of said core to change the angle of inclination of the roll faces to thereby vary the angle of inclination of said extending sides from said core.

12. In an apparatus for forming a bead flipper having a flipper strip folded around a bead core, said strip extending outwardly from said core at an angle inclined to the axis of said core, means for simultaneously pressing the sides of said strip extending beyond said core together and increasingly stretching said sides from a minimum adjacent said core to a maximum at their free edges, said means comprising a pair of rotatable frusto-conical forming rolls for frictionally engaging the extending sides of the flipper strip between the conical faces thereof, the faces of said rolls engaging said extending sides being inclined relative to the axis of said core, an auxiliary roll eccentrically driven by one of said rolls capable of forcing said bead core against the other of said rolls to rotate said bead, means for rotating said rolls, and means for bodily moving said rolls in the plane of the extending sides of said flipper strip to change the degree of stretch imposed on said sides by said rolls.

13. In an apparatus for forming a bead flipper having a flipper strip folded around a bead core, said strip extending outwardly from said core at an angle inclined to the axis of said core, means for simultaneously pressing the sides of said strip extending beyond said core together and increasingly stretching said sides from a minimum adjacent said core to a maximum at their free edges, said means comprising a pair of rotatable frusto-conical forming rolls for frictionally engaging the extending sides of the flipper strip between the conical faces thereof, the faces of said rolls engaging said extending sides being inclined relative to the axis of said core, an auxiliary roll eccentrically driven by one of said rolls capable of forcing said bead core against the other of said rolls to rotate said bead, means for rotating said rolls, means for bodily moving said rolls in the plane of the extending sides of said flipper strip to change the degree of stretch imposed on said sides by said rolls, and means for bodily shifting said rolls relative to the axis of said core to change the angle of inclination of the roll faces to thereby vary the angle of inclination of said extending sides from said core.

14. In an apparatus for forming bead flippers, a rotatable roll for folding the intermediate portion of a flipper strip around a bead core, comprising a pair of oppositely disposed frusto-conical members, a rotatable shaft for driving said members, one of said members being rigidly mounted on said shaft and the other of said members being movable longitudinally of said shaft, the smaller diametered bases of said members being spaced from each other to receive the intermediate portion of said flipper strip and to fold the intermediate portion of said strip around the lateral sides of said bead core, and means for rotating said shaft.

15. In an apparatus for forming bead flippers, means for folding a flipper strip around a bead core, comprising a rotatable shaft, a frusto-conical member rigidly secured to said shaft, a second frusto-conical member facing said first member and being capable of moving longitudinally of said shaft and capable of rotating therewith, the smaller diametered faces of said members being spaced from each other to receive and fold the central portion of said flipper strip around said bead core, spring means forcing said movable member toward said fixed member to hold said strip and fabric therebetween, and means for rotating said shaft.

16. In an apparatus for forming bead flippers, means for folding a flipper strip around a bead core, comprising a rotatable shaft, a pair of frusto-conical members, one of said members being rigidly secured to said shaft and the other of said members being slidable longitudinally of said shaft, a cylindrical member on said shaft, said cylindrical member being of lesser diameter than and extending between the smaller diametered bases of said members, resilient means forcing said slidable member toward said fixed member to fold the central portion of said flipper strip around the inner circumferential and lateral side faces of said bead core positioned between the smaller diametered bases of said members, and means for rotating said shaft.

17. In an apparatus for forming bead flippers, means for folding a flipper strip around a bead core, comprising a rotatable shaft, a frusto-conical member rigidly secured to said shaft, a second frusto-conical member facing said first member and being capable of moving longitudinally of said shaft and capable of rotating therewith, the smaller diametered faces of said members being spaced from each other to receive and fold the central portion of said flipper strip around said bead core, spring means forcing said movable member toward said fixed member to hold said strip and fabric therebetween, a frusto-conical member secured to one of said first frusto-conical members and having a stepped face thereon forming a substantial continuation of the conical face of the said first member, and means for rotating said shaft.

18. In an apparatus for forming bead flippers having a core and a flipper strip, feeding means comprising a rotatable main feed roll flatly supporting the flipper strip with the bead core centrally disposed thereon, a pair of spaced gathering rolls disposed to hold the flipper strip against said main feed roll at spaced points outwardly of said core, and means for providing gripping engagement of said main and gathering rolls with said strip in advance of the engagement between said core and strip.

19. In an apparatus for forming bead flippers having a core and a flipper strip, feeding means comprising a rotatable main feed roll for flatly supporting the flipper strip with the bead core centrally disposed thereon, and a pair of auxiliary feed rolls disposed to hold the flipper strip against the main feed roll at spaced points outwardly of said core, said auxiliary feed rolls having circumferentially corrugated strip engaging faces.

20. In an apparatus for forming bead flippers having a core and a flipper strip, feeding means comprising a rotatable main feed roll flatly supporting the flipper strip with the bead core centrally disposed thereon, a pair of spaced gathering rolls disposed to hold the flipper strip against said main feed roll at spaced points outwardly of said core, and means for providing gripping engagement of said main and gathering rolls with said strip in advance of the engagement between said core and strip, said gathering rolls having circumferentially corrugated strip engaging faces.

21. In an apparatus for forming bead flippers having a core and a flipper strip, feeding means comprising a rotatable main feed roll for flatly supporting the flipper strip with the bead core centrally disposed thereon, and a pair of auxiliary feed rolls disposed to hold the flipper strip against the main feed roll at spaced points outwardly of said core, the face of said main feed roll having a series of longitudinal corrugations at its ends and the faces of said auxiliary rolls having longitudinal corrugations cooperating with the corrugations of said main feed roll to grip the said strip therebetween.

22. In an apparatus for forming bead flippers having a core and a flipper strip, feeding means comprising a rotatable main feed roll flatly supporting the flipper strip with the bead core centrally disposed thereon, a pair of spaced gathering rolls disposed to hold the flipper strip against said main feed roll at spaced points outwardly of said core, and means for providing gripping engagement of said main and gathering rolls with said strip in advance of the engagement between said core and strip, the face of said main feed roll having a series of longitudinal corrugations at its ends and the faces of said gathering rolls having longitudinal corrugations cooperating with the corrugations of said main feed roll to grip the said flipper strip therebetween.

23. In an apparatus for forming bead flippers having a core and a flipper strip, feeding means comprising a rotatable main feed roll, the ends of said roll being tapered outwardly toward the axis thereof and formed with axial corrugations around the periphery thereof, for supporting a flipper strip, and a pair of coaxial frusto-conical gathering rolls having their axes parallel to the axes of said main feed roll, said gathering rolls having their faces corrugated for cooperation with said corrugations to grip the flipper strip therebetween.

24. In an apparatus for forming bead flippers, means for folding a flipper strip around a bead core, means for feeding said strip to said folding means, forming means for simultaneously pressing said sides together and increasingly stretching said sides from a minimum amount adjacent to said core to a maximum at the marginal edges thereof, means cooperating with said folding means for rotating said core at a peripheral speed less than the speed of the flipper strip being fed to said folding means, and driving means for simultaneously driving said feeding and forming means.

25. In an apparatus for forming bead flippers, means for rotating a bead core, folding means for wrapping the central portion of a flipper strip around and projecting the sides thereof beyond said core, means for feeding said flipper strip to said folding means at a speed greater than the peripheral speed of said core, forming means for simultaneously pressing said sides together at an angle to the axis of said core and for stretching the sides of said strip a greater amount at their marginal edges than at portions adjacent to said core, and means for operating said folding, feeding and forming means, said rotating means for said core being driven by said forming means.

26. In an apparatus for forming bead flippers, a V-shaped roll for folding a flipper strip around a bead core, said roll having a groove for receiving said core, a rotatable feed roll for feeding said flipper strip to said V-shaped roll and for driving said roll, the peripheral speed of said feed roll being greater than the peripheral speed of the bottom of said groove in said V-shaped roll, forming means for simultaneously pressing said sides together and increasingly stretching said sides from a minimum amount adjacent to said core to a maximum at the marginal edges thereof, and means for driving said feed roll and said forming means.

27. In an apparatus for forming bead flippers, a V-shaped roll for folding a flipper strip around a rotatable bead core, a rotatable feed roll for driving said V-shaped roll and for feeding a flipper strip thereto, a pair of frusto-conical forming rolls disposed at an angle to the axis of said core for simultaneously pressing the sides of said strip together and increasingly stretching said sides from a minimum amount adjacent to said core to a maximum at the marginal edges thereof, and an auxiliary roll rotated by one of said forming rolls cooperating with the other of said rolls to rotate said bead core, and driving means for rotating said feed roll and said forming rolls.

28. In an apparatus for forming bead flippers, rotatable mechanical means for folding a flipper strip around and projecting the sides thereof beyond a bead core, a pair of frusto-conical rolls for increasingly stretching said sides from a minimum amount adjacent to said core to a maximum amount at the marginal edges thereof, and for simultaneously pressing said sides together to form a frusto-conical flange around said core, an auxiliary roll on one of said rolls for yieldably holding the bead portion of said bead flipper against the other of said rolls, and driving means for said folding and forming means.

29. In an apparatus for forming bead flippers, means for folding a flipper strip around and projecting the sides thereof beyond a bead core, a pair of frusto-conical rolls for pressing the sides of said strip together and for simultaneously stretching said sides from a minimum amount adjacent to said core to a maximum at the marginal edges thereof, means eccentrically driven by one of said rolls and cooperating with the other of said rolls for yieldably gripping and rotating said bead core, and driving means for said folding means and said rolls.

30. In an apparatus for forming bead flippers, means for folding a flipper strip around and projecting the sides thereof beyond a bead core, a pair of frusto-conical rolls positioned at an angle to the axis of said core for pressing the sides of said strip together and for simultaneously stretching said sides from a minimum amount adjacent to said core to a maximum at the marginal edges thereof, an auxiliary roll having its axis parallel with one of said rolls and cooperating with the other of said rolls for gripping the bead portion of said flipper therebetween and for rotating said bead portion, and driving means for said folding means and said rolls.

31. In an apparatus for forming bead flippers, a rotatable feed roll for feeding a flipper strip to a rotating bead core, a pair of frusto-conical rolls yieldably gripping the bead portion of said flipper for folding said strip around the inner circumferential face and lateral faces of said core and for projecting the sides thereof beyond said core, a pair of forming rolls for simultaneously pressing said sides together and increasingly stretching said sides from a minimum amount adjacent to said core to a maximum at the marginal edges thereof, means cooperating with said forming rolls for rotating said core, and driving means for said feed roll and forming means.

32. In an apparatus for forming bead flippers, a device for simultaneously pressing the sides of the bead flipper together and for increasingly stretching the same from a minimum adjacent the bead core to a maximum at the free marginal edges thereof, comprising a pair of frusto-conical forming rolls, one driven by the other, said rolls having their axes converging at an acute angle toward a point disposed substantially away from the axis of the bead core and out of the plane of the bead core, means for supporting said forming rolls, and releasable means for holding said rolls in operative position.

33. In an apparatus for forming bead flippers, a rotatable feed roll for feeding a flipper strip to a rotating bead core, a pair of yieldingly separable frusto-conical rolls for folding said strip about the inner circumferential face and lateral faces of the core and for projecting the sides thereof beyond the core, forming means for receiving said strip and core from said frusto-conical rolls to press the sides of the strip together and simultaneously therewith to increasingly stretch the abutting sides from a minimum adjacent said core to a maximum at the marginal edges thereof, means cooperating with said forming means to rotate said core and strip, and means in advance of the contact of said core with said strip to exert a drag effect on said core.

HAROLD A. DENMIRE.